Nov. 11, 1952          H. H. JOHNSON          2,617,864
TEMPERATURE-RESPONSIVE CONTROL SYSTEM FOR OPERATING
HEAT METERING DEVICES OR THE LIKE
Filed Oct. 11, 1946          2 SHEETS—SHEET 1

FIG. 1ᵃ

HENRY H. JOHNSON, Inventor

By McMorrow, Berman & Davidson
Attorneys

Patented Nov. 11, 1952

2,617,864

UNITED STATES PATENT OFFICE 2,617,864

TEMPERATURE-RESPONSIVE CONTROL SYSTEM FOR OPERATING HEAT METERING DEVICES OR THE LIKE

Henry H. Johnson, Oakland, Calif.

Application October 11, 1946, Serial No. 702,644

3 Claims. (Cl. 175—320)

This invention relates generally to control systems and particularly to an atmospheric condition control system wherein an electronic system reacts to a deviation from a given condition to motivate a restoring influence. In its most specific application, this invention relates to temperature control apparatus in which a heat metering device such as a gas valve is arranged to be opened or closed by a motor which responds to a potential unbalance in a resistance network in which the resistors have dissimilar temperature coefficients.

In the specific embodiment of my invention which is described in the present application, the heat metering device may be driven by an electric motor which is controlled by means of an electrical comparing device. The latter includes mechanism for deriving one voltage representative of an ambient value, and a further voltage representative of the deviation from ambient. In so far as the representative voltages have different magnitudes, novel controlling tube circuits are activated to energize relay systems which in turn determine the polarity and magnitude of voltages to be applied to the driving motor. I also provide auxiliary devices which render my novel control apparatus more useful generally, these devices including a novel control device wherein the representative voltages have different magnitudes depending on the relative humidity.

While I herein describe my invention as applied only to the control of temperature or relative humidity, it will be obvious that it is applicable in any system wherein a change in the magnitude of a resistance is anticipated. For instance, my device may be used to control the ratio of contaminating gases in a given atmosphere, if one of the resistances is chosen of a type known to change in value as a result of absorption of contaminating gases.

It is, accordingly, an object of my invention to provide a device for controlling temperature in accordance with comparison voltages.

It is another object of my invention to provide novel control circuits for controlling the direction of rotation and speed of electric motors.

It is still another object of my invention to provide simple, reliable and efficient means for maintaining the value of a resistance which is a function of temperature at a given difference from that of a standard resistance.

It is still a further object of my invention to provide devices which generate a control voltage proportional to the resistance deviation of two bodies and which may be utilized for controlling mechanisms of various character.

It is still a further object of my invention to provide devices which act to cyclically control temperature.

It is another object of this invention to provide a relay circuit controlled by preferably gas-filled tubes which operate the relay differentially in accordance with the polarity of a control voltage applied to an input circuit for the tubes.

The above and still further objects and advantages of my invention will become apparent upon study of the following detailed description thereof when taken in conjunction with the accompanying drawings; wherein Figure 1 is a block design of the fundamental elements of my invention applied to the control of a heat metering device;

The arrangement of the parts and their mode of operation in my heat metering embodiment will be explained fully with reference to Figures 1 and 1a.

Figure 1:
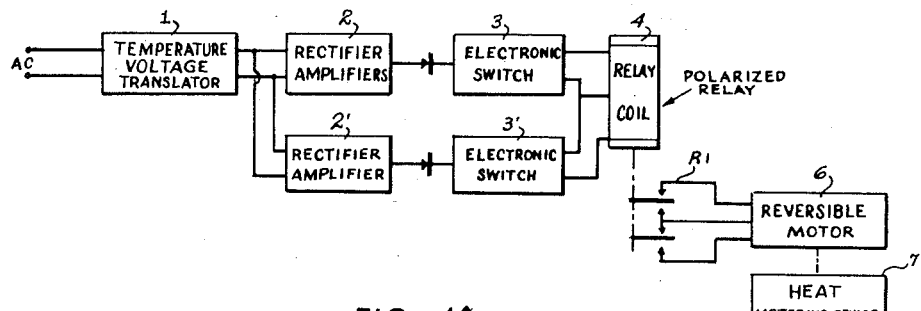
Figure 1a is a schematic diagram of the fundamental elements of my invention applied to the control of a heat metering device.
Figure 1:
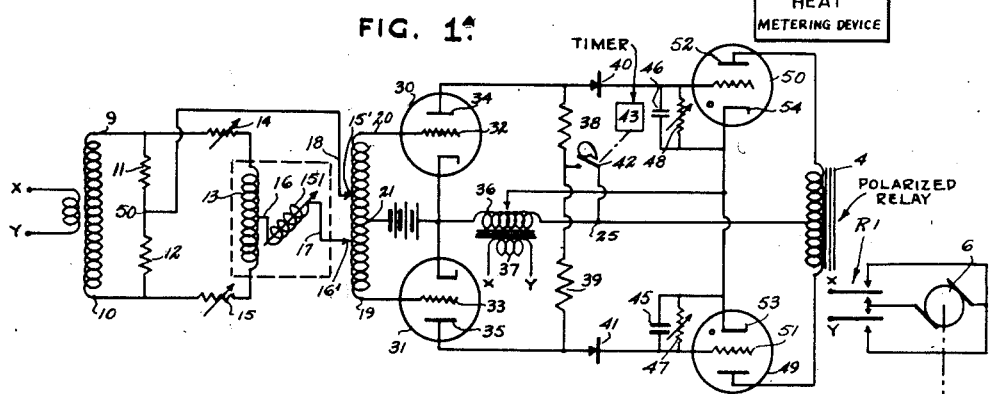

Figure 1 shows in block form a temperature to voltage translating device 1 which is adjusted manually to give no output potential at a selected temperature. Above this temperature the output alternating potential is a function of the incremental temperature and in addition is opposite in phase to the output potential created by a negative change in temperature.

The output potential is applied in opposite phase of two rectifier amplifiers 2 and 2', only one of which is operative at any time depending on the direction of the temperature drift.

The two rectifier amplifiers are connected to respective switches 3, 3' preferably of the gas filled electronic type. The electronic switches are connected to the opposite ends of the field coil of a double throw polarized relay 4. This coil is center tapped to permit the application of the anode potential to the electronic switch tubes. Since only one of the two amplifiers is conducting at any one time, and this is determined by the direction of temperature drift, only one of the electronic switch tubes is rendered conductive and therefore the relay will close in a direction determined thereby. The relay has contacts designated generally at R, which control the direction of application of the potential applied to reversible motor 6. The motor will therefore turn in a direction determined by the direction of temperature shift and operate the metering device 7 which may be a gas valve, damper or electrical element to change the heat output, either more or less, to restore that temperature for which the temperature voltage translater has no output.

The temperature to voltage translator

Referring now specifically to Figure 1a of the accompanying drawing, reference letters X and Y denote a pair of terminals on the primary of a transformer which may be connected to any suitable source of alternating current power. Connected across the secondary terminals, shown respectively at 9 and 10, are a pair of resistors 11 and 12 and the field coil 13 of a telemetric device in series with variable resistors 14 and 15. The resistance 11 is selected to have an appreciable temperature coefficient, preferably negative in character. Resistance 12 is selected to have a temperature coefficient different from resistance 3, and preferably has a zero temperature coefficient. The field coil 13 of the telemetric device is energized to a degree depending on the value of resistances 14 and 15. This device is described in detail in U. S. patent application Serial #657,309, filed March 26, 1946, in the name of the present inventor, and is of a type wherein the voltage applied to the field coil 13 affects calibration but not the position of the moving coil 151. The position of the moving coil 151 is affected by the position of the tap, shown at 16, on the field coil 13. Accordingly, to zero-set the moving coil 151 without affecting the calibration of the device, the field energization must remain a constant by maintaining the series impedance of resistors 14 and 15 and field coil 13 a constant. The potential at point 16 can be varied without disturbing calibration by varying the value of resistors 14 and 15 by maintaining their sum a constant. The potential of the junction point 50 of the resistors 11 and 12 is the algebraic sum of the potential across standard resistance 12 and that across temperature responsive resistor 11. The potential derived from the moving coil 151 of the telemetric device at conductor 17 is adjusted to equality with that potential present at the junction point of the resistances 11 and 12 and therefore on conductor 17 at the desired ambient condition. Designated at 18 is a conductor connected between junction point 50 and a movable tap 15' of an auto-transformer 21. Conductor 17 is connected to a movable tap 16' of said auto-transformer.

The potential difference between conductors 17 and 18 is now a function of the ratio of resistance element 11 to resistance element 12. If, for example, the temperature increases, and resistance 11 has a negative characteristic, the resistance drop across element 11 decreases and the potential on conductor 18 gains an increment in the direction of the potential at terminal 9. If the temperature decreases, the potential on conductor 18 obtains an increment in the direction of the potential at terminal 10. The potential on conductor 17 remains constant so long as the sum resistance of resistors 14 and 15 is a constant, their ratio is not changed, and the position of moving coil 151 is not changed. Therefore, the potential between conductors 18 and 17 is a function of temperature, and, in a manner which will become apparent from the following description, is used to excite a restoring mechanism.

The rectifier amplifiers and the electronic switches

Conductors 17 and 18 are connected to spaced taps 16' and 15' of auto-transformer 21. Amplifying tubes 30 and 31 containing control grids 32 and 33 and anodes 34 and 35 respectively are connected in a direct coupling relation through rectifiers 40 and 41 with tubes 50' and 49 which are preferably of a gas-filled type. The anodes of tubes 49 and 50' are connected to the ends of the center-tapped coil 4 of a polarized relay whose contacts are designated at $R_1$. Anode power is supplied to tubes 30 and 31 by a voltage step-up transformer 36—37, the secondary 36 of which is connected at one end to the commonly joined cathodes of tubes 30 and 31. The remaining end of secondary 36 is connected to the center tap of energizing coil 4 of the polarized relay, thus providing anode power for tubes 49 and 50 and also through a timer controlled switch 43 to anode load resistors 38 and 39.

The anodes 34 and 35 of amplifier tubes 30 and 31 are coupled through rectifiers 40 and 41 respectively to the grids 52 and 51 of electronic switch tubes 50' and 49. Capacitors 45, 46 and resistors 47 and 48 are provided between the grids and cathodes of tubes 49 and 50' respectively.

The mode of operation of my apparatus will now be described. A change in temperature from that for which the temperature translator is balanced, will cause an alternating voltage, the phase of which depends on a direction of temperature change, to appear between conductors 17 and 18. This voltage is coupled into grids 32 and 33 of tubes 30 and 31 in opposite phase by transformer terminals 20 and 19 and center tap of the transformer 21. Anodes 34 and 35 are energized in phase with alternating voltage by the closing of switch 42 by timer motor 43. Due to the fact that the anode voltage source is alternating and has a fixed phase relation with the voltage applied to resistors 11 and 12, and since grids 32 and 33 are energized on opposite half cycles, only one of the tubes will conduct when the voltage applied to its grid is positive going when the anode voltage is positive going. Since the anodes are fed in phase, the opposite phase voltages applied to the grids are controlling. Therefore, only that tube will conduct which is grid energized in the right direction and the direction of energization is determined by the temperature. Assuming for purposes of explanation that the temperature has increased and the negative coefficient resistance 11 has decreased in value, conductor 18 will be energized with a voltage in phase with that on terminal 9. For purposes of explanation, a condition of positive half cycle on terminal 9 is assumed. Conductor 18 will also have a positive potential. This will cause the potential on grid 32 to become less negative and grid 33 to become more negative. Tube 30 will therefore have less resistance than tube 31. The anode potential derived from anode voltage supply transformer 36 at the moment being considered, is positive. Therefore, tube 30 is conducting but tube 31 is not conducting because of the negative grid condition. On a negative half cycle, the potentials on the grids are reversed, grid 33 of tube 31 now becoming positive, and grid 32 of tube 30 becoming negative, but neither tube conducts because the anode potential applied to both tubes is negative. Therefore, under the assumed condition since tube 30 is in a conducting condition part of the time, in other words, has a lower internal resistance, the potential at rectifier 40 is decreased in magnitude whereas that at rectifier 41 is unchanged. The rectifiers 40 and 41 are polarized to pass current in the direction of the arrows. Since the potential on rectifier 41 is greater in magnitude than that on 40, rectifier 41 will pass a greater current on positive half cycles than will rectifier 40. The rectified half cycles causes the capacitor 45 to become charged and therefore a positive potential is applied to grid 51 of gas tube 49 which is triggered into conducting condition. The positive potential applied to grid 51 is less than that applied to the plate of tube 49. Accordingly, polarized relay winding 4 is energized by the anode current of tube 49, thereby energizing motor 6 which operates heat source controlling means 7, which may be a gas valve, or other thermal control means. This adjustment is not continuous in view of the intermittent operation of timer 43, and the dissipating of the charge on capacitor 45 through the resistance 47. However, the length of the adjustment period depends on the charge on capacitor 45 and this charge is a function of the potential on conductor 18, which is proportional to the deviation of temperature from ambient. Timer 43 is chosen to have a rate of closing depending on the rapidity with which the corrective temperature change is desired. Since timer 43 opens and closes the anode circuit of the tubes 30 or 31 at a predetermined frequency, the tube 50 or 49 can only be triggered at that frequency. Therefore relay winding 4 can only be energized at intermittent periods controlled by the frequency of closure of timer 43. The higher this frequency is, the more closely winding 4 approaches a condition of continuous energization during the temperature-corrective phase of the operating cycle of the apparatus. At low frequencies of timer closure the winding 4 will be energized for a much lower net period per time unit than at high frequencies of timer closure. Therefore more time units will be required at low frequencies of timer closure to accomplish a given temperature correction than would be required at high frequencies of timer closure.

Figure 2:
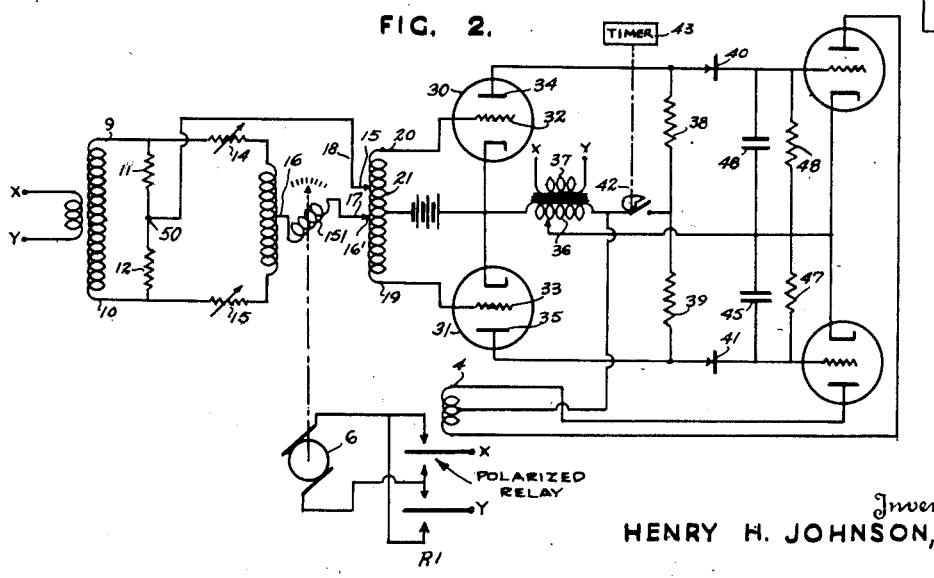
Figure 2 is a schematic diagram of an embodiment wherein my invention is arranged to function as a temperature indicating device.

My invention is also operative as a temperature recording device in the embodiment of Figure 2. Herein the motor 6 is mechanically coupled to moving coil 151 of a telemeter device. Therefore, when the motor 6 is energized, it does not operate upon a thermal valve but instead alters the position of the moving coil 151 to a position of balance between the voltages at conductors 17 and 18. Therefore, coil 151 will have a certain position corresponding to any particular temperature. A pointer and scale cooperatively related to moving coil 151 will therefore operate to read directly in temperature. Whether this temperature is absolute or only relative to a given ambient depends upon the initial calibration of the instrument.

It is also feasible by combining the teachings of Figure 1 and Figure 2 to indicate temperature as well as to control it, all parts being duplicated except resistors 11 and 12. I also find it desirable in some cases to anticipate temperature change in which case I place resistance 12 in the medium whose temperature is to be controlled, as for instance the inside of an airplane and I place resistor 11 outside the airplane. In this case, resistor 11 should have a positive temperature coefficient. Now, if the airplane is in a moderate temperature region, the value of 12 will be normal and that of resistance 11 will be normal, and the system will be balanced, but if the airplane goes to a cold region, the resistance of 11 will decrease, thereby lowering the potential of conductor 18 and accordingly will register an effect equivalent to a lowering of the temperature in the airplane. This will cause the motor to increase the production of heat and this will raise the temperature of the medium in the airplane to anticipate its being lowered by the outside air.

Figure 3:
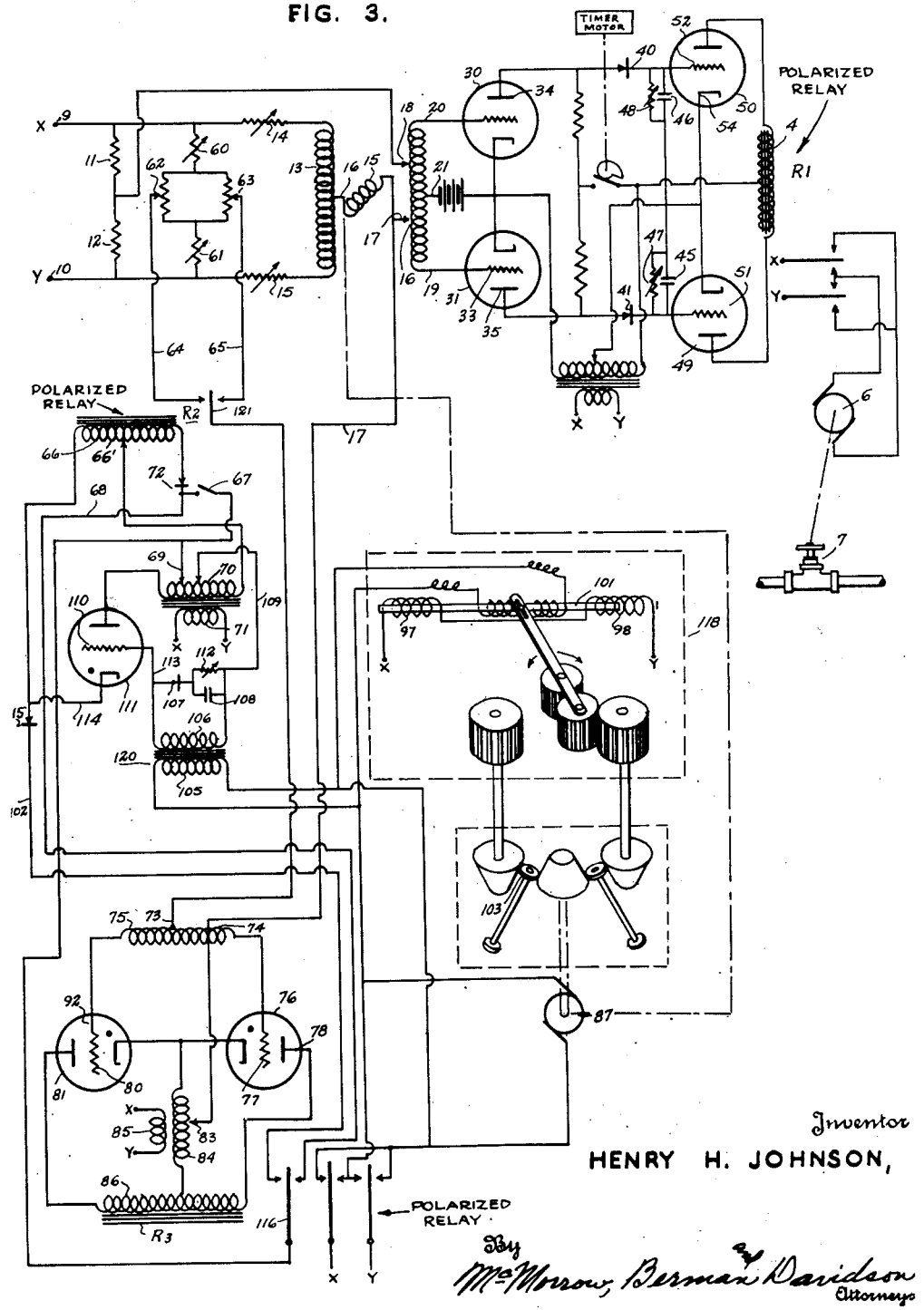
Figure 3 is a block diagram of a temperature cycling device.

A third embodiment of my invention which is capable of functioning to control temperature in accordance with a predetermined cycle is shown in Figure 3. The novel system of controlling a heat cycle finds application whenever it is desired to cycle the temperature through any predetermined range, for instance, during the heat treatment of metals.

Referring now specifically to Figure 3 of the drawings, which is to be taken in conjunction with Figures 1a and 2, the latter figures illustrate the basic system of the invention, the circuit diagram of Figure 3 illustrating circuits and apparatus for causing a cycle's variation of temperature.

As was pointed out previously, any increment of potential on conductor 18 which differs from that on conductor 17, causes the thermionic relay circuit to actuate a heat control means in such direction as to correct for the unbalance. Now conversely if the potential at 18 is varied from the balanced condition, the temperature will be caused to rise or fall until the potential at 18 is again equivalent to that at 17. The potential variation at 17 corresponds to the temperature change desired.

To apply this principle of operation, I provide an additional resistance network connected across terminals 9 and 10 consisting of two rheostats, 60 and 61, and two potentiometers, 62 and 63 connected in parallel to the inner terminals of rheostats 60 and 61 in the manner shown in Figure 3. I set the rheostats 60 and 61 to provide potentials across potentiometers 62 and 63 within the range of the potential variation on conductor 18. I set a potential on potentiometer 63 corresponding to an upper temperature limit, and I set the potential on potentiometer 62 corresponding to a lower temperature limit. These potentials are conducted to the stationary contacts of a single pole double throw relay R–2. The blade contact of relay R–2 is connected to a tap 73 on an auto transformer 75. The energizing portion of the auto-transformer 75 is also connected to the output of the telemetric device at 17 by a conductor 17' connecting conductor 17 to a tap 74 on auto-transformer 75. The end terminals of transformer 75 are connected to the respective grids 77 and 80 of two tubes, 76 and 81, which energize the field coil 86 of relay R–3 in the same manner that tubes 49 and 50' energize relay coil 4. Relay R–2 is energized by a field coil 66, which is connected at a tap 66' thereof to one end of a power transformer secondary 70, the primary 71 of which is connected in proper phase to the source of alternating voltage. Connected between one end of relay coil 66 at conductor 114 and the second end of power transformer secondary 70, I connect the cathode and anode of a thermionic trigger tube 111. Between conductor 114 and lead 102 I provide a rectifier 115 in series with a contact of relay R–3. Between lead 68 and the opposed end of relay coil 66 I provide a rectifier 72. Designated at 116 is a blade contact of relay R–3 which is connected to conductor 68 through a push button switch 67. The grid 110 of thermionic trigger tube 111 is connected to one side of a rectifier 107, the other side of 107 being connected to a capacitance 108 and a variable resistance 112. The rectifier 107 is connected to secondary 106 of power transformer 120. The primary 105 of transformer 120 is energized by alternating current when relay R–3 is in a position which will later become apparent. Also energized by relay R–3 is a motor 87 which operates through a reversible adjustable speed drive to adjust telemeter coil 151 at a desired rate. The movable contacts of the potentiometers 62 and 63 are connected by respective conductors 64 and 65 to the opposing stationary contacts of relay R2.

The operation of this device will now be explained. As stated previously, conductors 64 and 65 carry potentials which correspond to the potentials at the junction of resistors 11 and 12 at the desired limiting temperatures. Now push button 67 is manually closed. This energizes with pulsating direct current, a portion of the field coil 66 of relay R–2, thereby causing relay blade 121 to close with conductor 65. The difference in potential between taps 73 and 74 causes either tube 76 or 81 to conduct thereby energizing field coil 86 of relay R–3 in the proper direction to energize motor 87 which will turn telemetric coil 151 through the variable speed coupling 117. As R3 is closed blade 116 will be connected to conductor 68 to establish a holding circuit to hold R2 closed until R3 is opened. The grid 110 of trigger tube 111 normally has no bias voltage thereon but when R–2 closes, primary 105 of transformer 120 becomes energized, as above explained, and secondary 106, acting in conjunction with the rectifying shunt circuit comprising rectifier 107 and resistor 112 connected thereto, introduces a negative blocking bias on grid 110. Tube 111 is therefore non-conducting at this stage of operation. Coil 151 will continue to be driven until the potentials on lead 64 and tap 74 are equal. However, as soon as coil 151 is moved, an input potential difference between the tap connections of conductors 17 and 18 on the input transformer 21 to tubes 30 and 31 is created. As explained previously, this will result in the energization of heat controlling motor 6 in a direction to equalize the input potentials. When motor 87 turns in one direction, gear shifting mechanism 118, including polarized armature 101, is moved by solenoid action in a direction determined by the phase of the current on armature 101 with respect to the field coils 97 and 98.

The rate of movement of coil 151 determines the rate of change of temperature. The adjustments of the taps of potentiometers 62 and 63 determine the high and low limits of the temperature cycle. When coil 151 has been turned to a position which gives equal potentials on taps 73 and 74, tube 76 stops conducting and relay R3 opens control. This stops motor 87 and also removes the potential from rectifier 107, thereby permitting capacitor 108 to discharge. The discharge of capacitor 108 removes the blocking bias from tube 111, which now becomes conducting and throws relay R–2 to connect conductor 64 carrying the second limiting potential from potentiometer 62 to the transformer 75. The potential across transformer 75 now renders tube 81 conducting. This closes relay R–3 in the opposite direction to that first described, whereby motor 87 now turns in the reverse direction and gear shifting mechanism 118 is shifted. The rate of motion of coil 151 is now determined by the setting of the transmission idler 103, and its direction is opposite to that first described. It should be noted that once relay R–2 is thrown by tube 111 conducting, that blade contact 116 of relay R–3 connects with conductor 102, whereby a holding current passes through coil 66, rectifier 115 and part of transformer secondary winding 70. As soon as relay R–3 makes contact tube 111 is biased to cut-off by transformer 120, rectifier 107, capacitor 108 and resistor 112. Motor 87 drives coil 151 until the potentials on conductor 64 and tap 74 are equal, and relay R–3 again opens. This completes the desired cycle and to repeat, switch 67 would have to be again momentarily closed.

A period of temperature hold at the second limit to which the temperature attains in the course of its cycle is provided by a timing circuit including tube 111, rectifier 107, resistor 112 and capacitor 108 in parallel and transformer 120. A cycle is started by closure of switch 67. The relay winding 66 may be energized to throw contact R2 in the proper direction when switch 67 is closed, via a circuit including rectifier 72, a first part of coil 66, the lead to coil 70 and the included portion of coil 70, despite the fact that bucking current may be supplied by the tube 111 to the remaining portion of coil 66.

While I have described my invention as embodied in temperature controlling circuits, it will be clear that modification and structural details thereof may be resorted to without departing from the spirit of the invention. It will be further evident that although I have disclosed, on a preferred use of my invention, its application to temperature controlling, many and diverse modes of utilization thereof may be found. In essence, my invention relates to a motor control, the motor being controllable in accordance with voltages which are a function of temperature, or are selectable. I may utilize my controllable motor to control temperature, heating, refrigeration, heat treating metals, fever therapy, or for any of a large number of diverse but analogous purposes.

I, accordingly, desire that my invention shall be restricted in its scope only by the terms and scope of the claims appended hereto.

What I claim and desire to secure by Letters Patent of the United States is:

1. A temperature responsive electric control system comprising a control relay for a reversible motor, a single bridge circuit including a first voltage source having opposite ends, a first resistor having a resistance variable in proportion to variations in the temperature thereof, a second resistor of constant resistance, said first and second resistors being connected between the opposite ends of said first voltage source in series with each other, a third resistor connected between the opposite ends of said first voltage source in parallel with said first and second resistors, manually adjustable resistors connected between said third resistor and said first and second resistors for balancing said bridge circuit at a predetermined temperature of said first resistor, a second voltage source having opposite ends and connected to said bridge circuit and energized by the latter whenever the temperature of said first resistor departs from the predetermined temperature for which said bridge circuit is balanced, the energization of said second voltage source being in respectively opposite directions depending upon whether the temperature of said first resistor is above or below said predetermined temperature, a third source of voltage having opposite ends and connected at one end to said relay intermediate the ends of the latter, a first electronic tube having a grid connected to one end of said second source of voltage, a second electronic tube having a grid connected to the other end of said second source of voltage, said first and second tubes each having an anode and each having a cathode both of which are connected to the other end of said third source of voltage and being alternately rendered conductive in response to increase or decrease of the resistance of said first resistor above or below the adjusted resistance of said second resistor, a third electronic tube having a grid connected to the anode of said first tube and an anode connected to one end of said relay, a fourth electronic tube having a grid connected to the anode of said second tube and an anode connected to the other end of said relay, said third and fourth tubes each having a cathode both of which are connected to said third voltage source intermediate the length of the latter and being alternatively rendered conductive in response to the conductivity of said first and second tubes respectively to energize said relay in respectively opposite directions.

2. A temperature responsive electric control system comprising a control relay for a reversible motor, a single bridge circuit including a first voltage source having opposite ends, a first resistor having a resistance variable in proportion to variations in the temperature thereof, a second resistor of constant resistance, said first and second resistors being connected between the opposite ends of said first voltage source in series with each other, a third resistor connected between the opposite ends of said first voltage source in parallel with said first and second resistors, manually adjustable resistors connected between said third resistor and said first and second resistors for balancing said bridge circuit at a predetermined temperature of said first resistor, a second voltage source having opposite ends and connected to said bridge circuit and energized by the latter whenever the temperature of said first resistor departs from the predetermined temperature for which said bridge circuit is balanced, the energization of said second voltage source being in respectively opposite directions depending upon whether the temperature of said first resistor is above or below said predetermined temperature, a third source of voltage having opposite ends and connected at one end to said relay intermediate the ends of the latter, a first electronic tube having a grid connected to one end of said second source of voltage, a second electronic tube having a grid connected to the other end of said second source of voltage, said first and second tubes each having an anode and each having a cathode both of which are connected to the other end of said third source of voltage and being alternately rendered conductive in response to increase or decrease of the resistance of said first resistor above or below the adjusted resistance of said second resistor, a third electronic tube having a grid connected to the anode of said first tube and an anode connected to one end of said relay, a fourth electronic tube having a grid connected to the anode of said second tube and an anode connected to the other end of said relay, said third and fourth tubes each having a cathode both of which are connected to said third voltage source intermediate the length of the latter and being alternatively rendered conductive in response to the conductivity of said first and second tubes respectively to energize said relay in respectively opposite directions, load resistors connected in series between the anodes of said first and second tubes and means including a periodically closed switch connecting said load resistors at their interconnected ends to said one end of said third voltage source to limit conductivity of either of said third and fourth tubes and consequent energization of said relay to spaced apart successive time intervals.

3. A temperature responsive electric control system comprising a control relay for a reversible motor, a single bridge circuit including a first voltage source having opposite ends, a first resistor having a resistance variable in proportion to variations in the temperature thereof, a second resistor of constant resistance, said first and second resistors being connected between the opposite ends of said first voltage source in series with each other, a third resistor connected between the opposite ends of said first voltage source in parallel with said first and second resistors, manually adjustable resistors connected between said third resistor and said first and second resistors for balancing said bridge circuit at a predetermined temperature of said first resistor, a second voltage source having opposite ends and connected to said bridge circuit and energized by the latter whenever the temperature of said first resistor departs from the predetermined temperature for which said bridge circuit is balanced, the energization of said second voltage source being in respectively opposite directions depending upon whether the temperature of said first resistor is above or below said predetermined temperature, a third source of voltage having opposite ends and connected at one end to said relay intermediate the ends of the latter, a first electronic tube having a grid connected to one end of said second source of voltage, a second electronic tube having a grid connected to the other end of said second source of voltage, said first and second tubes each having an anode and each having a cathode both of which are connected to the other end of said third source of voltage and being alternately rendered conductive in response to increase or decrease of the resistance of said first resistor above or below the adjusted resistance of said second resistor, a third electronic tube having a grid connected to the anode of said first tube and an anode connected to one end of said relay, a fourth electronic tube having a grid connected to the anode of said second tube and an anode connected to the other end of said relay, said third and fourth tubes each having a cathode both of which are connected to said third voltage source intermediate the length of the latter and being alternatively rendered conductive in response to the conductivity of said first and second tubes respectively to energize said relay in respectively opposite directions, load resistors connected in series between the anodes of said first and second tubes and at their interconnected ends to said one end of said third voltage source, and rectifiers interposed one between the anode of said first tube and the grid of said third tube and one between the anode of said second tube and the grid of said fourth tube.

HENRY H. JOHNSON.

(References on following page)

REFERENCES CITED

The following references are of record in the file of this patent:

UNITED STATES PATENTS

| Number | Name | Date |
|---|---|---|
| 1,170,727 | Baker | Feb. 8, 1916 |
| 1,942,587 | Whitman | Jan. 9, 1934 |
| 1,973,279 | Bernarde | Sept. 11, 1934 |
| 2,093,745 | Westell | Sept. 21, 1937 |
| 2,135,991 | Nessell | Nov. 8, 1938 |
| 2,164,728 | Wey | July 4, 1939 |
| 2,220,028 | Smith | Oct. 29, 1940 |
| 2,357,745 | Kliever | Sept. 5, 1944 |
| 2,366,500 | Eastin | Jan. 2, 1945 |
| 2,367,869 | Jones | Jan. 23, 1945 |
| 2,376,488 | Jones | May 22, 1945 |
| 2,384,380 | Isserstedt | Sept. 4, 1945 |
| 2,390,793 | Jones | Dec. 11, 1945 |
| 2,398,421 | Frische et al. | Apr. 16, 1946 |
| 2,423,534 | Upton | July 8, 1947 |
| 2,434,273 | Ketchledge | Jan. 13, 1948 |
| 2,441,568 | Finison | May 18, 1948 |